United States Patent

Sandig

[11] Patent Number: 6,161,450
[45] Date of Patent: Dec. 19, 2000

[54] VISCOSITY-TYPE TORSIONAL-VIBRATION DAMPER

[75] Inventor: Jörg Sandig, Berlin, Germany

[73] Assignee: Hasse & Wrede GmbH, Berlin, Germany

[21] Appl. No.: 08/894,915

[22] PCT Filed: Feb. 1, 1996

[86] PCT No.: PCT/DE96/00190

§ 371 Date: Oct. 10, 1997

§ 102(e) Date: Oct. 10, 1997

[87] PCT Pub. No.: WO96/27748

PCT Pub. Date: Sep. 12, 1996

[30] Foreign Application Priority Data

Mar. 3, 1995 [DE] Germany ............................ 195 07 519

[51] Int. Cl.$^7$ ............................. F16F 15/10; F16F 15/22; G05G 1/00; G05G 3/00

[52] U.S. Cl. ............................ 74/574; 74/572; 74/573 R; 74/573 F; 264/328.1

[58] Field of Search .................. 74/572–574; 264/328.1, 264/242, 271.1

[56] References Cited

U.S. PATENT DOCUMENTS

| | | | |
|---|---|---|---|
| 2,594,555 | 4/1952 | Hardy | 74/574 |
| 2,636,399 | 4/1953 | O'Connor | 74/574 |
| 2,724,983 | 11/1955 | O'Connor | 74/574 |
| 3,166,356 | 1/1965 | Sutherland . | |
| 3,264,898 | 8/1966 | O'Connor . | |
| 3,448,830 | 6/1969 | Desmond . | |
| 3,603,172 | 9/1971 | Hall | 74/574 |
| 3,640,149 | 2/1972 | McLean | 74/574 |
| 3,716,901 | 2/1973 | Bragg et al. . | |
| 3,913,980 | 10/1975 | Cobb . | |
| 4,419,314 | 12/1983 | Bush | 264/271.1 X |
| 5,142,936 | 9/1992 | McGale . | |
| 5,452,957 | 9/1995 | Duggan | 384/99 |
| 5,829,319 | 11/1998 | Mokeddem | 74/573 F X |

FOREIGN PATENT DOCUMENTS

| | | | |
|---|---|---|---|
| 0503424 | 9/1992 | European Pat. Off. . | |
| 2532387 | 3/1984 | France . | |
| 2130089 | 10/1972 | Germany . | |
| 3815505 | 12/1988 | Germany . | |
| 60-236715 | 11/1985 | Japan | 264/328.1 |
| 650891 | 3/1951 | United Kingdom . | |
| 1357200 | 6/1974 | United Kingdom | 74/573 F |
| WWO 94/21440 | 9/1994 | WIPO | 264/328.1 |

*Primary Examiner*—Vinh T. Luong
*Attorney, Agent, or Firm*—Barnes & Thornburg

[57] ABSTRACT

The invention is to a viscosity-type torsional vibration damper and a method of manufacturing such a damper, wherein the housing is constructed of thermoplastic plastic materials. A jacket element made of thermoplastic plastic material is placed around an annular element and a viscous damping fluid is then injected between the annular element and the thermoplastic plastic jacket element.

4 Claims, 2 Drawing Sheets

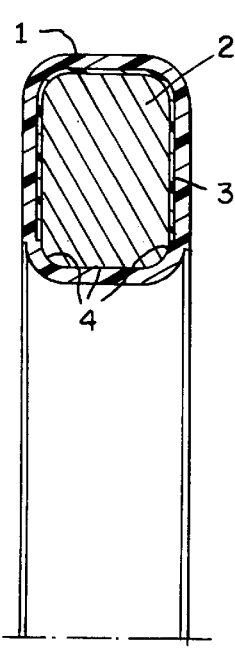
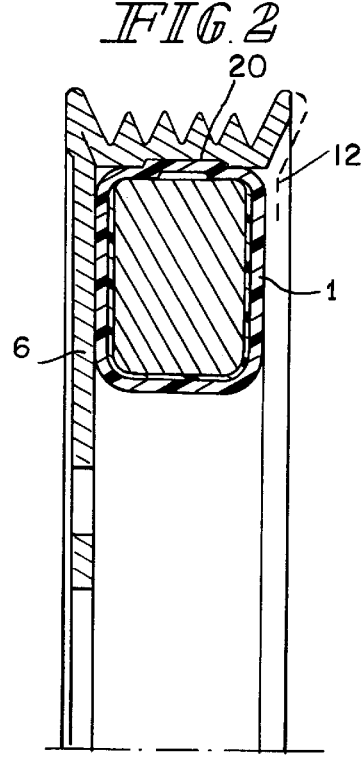
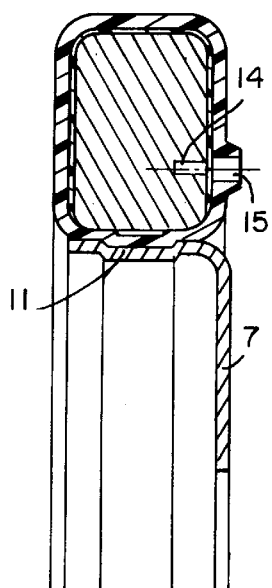
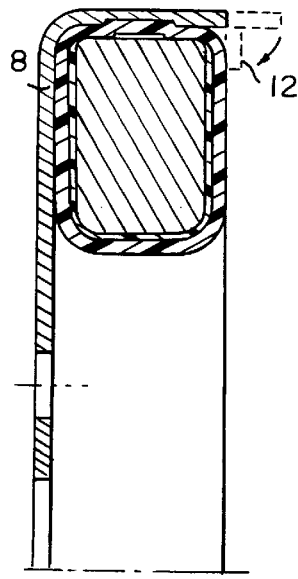
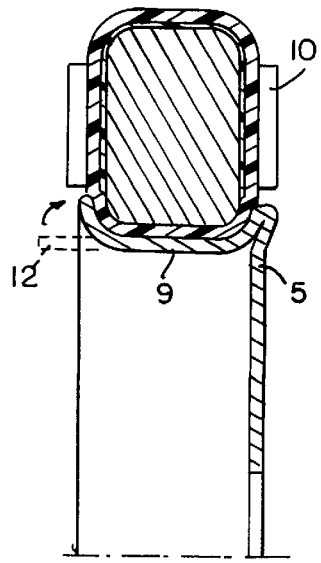
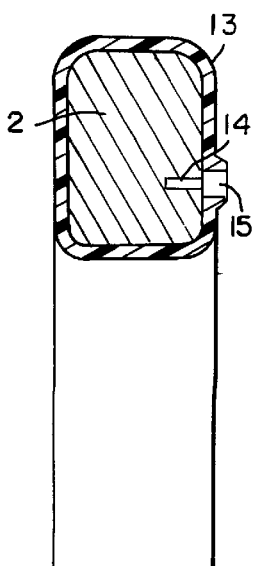

VISCOSITY-TYPE TORSIONAL-VIBRATION DAMPER

BACKGROUND AND SUMMARY OF THE INVENTION

The invention relates to a viscosity-type torsional vibration damper and to a method of manufacturing a viscosity-type torsional vibration damper.

Viscosity-type torsional vibration dampers in the many different embodiments have been known for a long time. The viscosity-type torsional vibration damper is a machine element which is preferably mounted at the crankshaft end of internal-combustion engines for the purpose of limiting torsional strains which result from the oscillating gas forces and inertial forces in the crankshaft.

The mass moment of inertia of the seismic ring, the gap geometry as well as the viscosity of the damping medium are relevant for the operation of the torsional vibration damper. The housing has the task of guiding the seismic ring over bearing surfaces and receiving the damping medium.

Since the housing is rigidly connected with the crankshaft, it causes, as the result of its mass, a lowering of the sympathetic vibration frequency of the mass system.

This may have the result that sympathetic vibrations of lower ordinal numbers reach the operational rotational speed range. In principle, a housing which is as light as possible is advantageous for the vibration system; especially since the housing part to be damped is included in the available damper performance.

Corresponding to the state of the art, metallic materials, preferably steel or cast iron, are used as the material for the housing. Attempts to use inelastic plastic materials were not successful and, after a short time, were not continued (see the type-forming German Patent Document DE OS 21 30089).

Because of the increased power of internal-combustion engines and for acoustic reasons, elements for limiting the torsional strain of the crankshaft are increasingly also used in the utility vehicle and passenger car field. For cost reasons, rubber dampers had predominantly been used in this performance class although the viscosity-type torsional vibration damper is more efficient. So far, the construction principle of the viscosity-type damper has required more components and higher mounting expenditures in comparison to the rubber damper.

The invention aims at providing a viscosity-type torsional vibration damper which can be used and produced at reasonable cost also in the case of lower-powered engines.

The invention achieves this goal.

In contrast to the state of the art, the invention suggests the use of thermoplastic materials. Previously the use of these plastic materials was obviously not considered possible because of the opinion that a plastic material does not meet the requirements concerning the strength, the thermal transmission and the resistance to heat as well as the chemical stability with respect to the damping medium. Furthermore, no suitable economical manufacturing methods were known. The invention refutes this prejudice. It also reduces The number of components and the manufacturing expenditures.

When a thermoplastic glidable plastic housing is used, no additional bearing elements are required for guiding the rotating ring. Furthermore, the machining expenditures for the components will be reduced because no cutting machining is required. The lower density of the plastic material results in a considerable reduction of weight. With respect to the acoustic behavior, a plastic housing exhibits better damping characteristics than a metallic housing.

In addition to the one-piece variant, it is particularly advantageous to construct the viscosity-type torsional vibration damper as two or more parts.

In the following, the invention will be explained in detail by means of embodiments with reference to the drawing.

BRIEF DESCRIPTION OF THE DRAWINGS

FIG. 1 shows a first embodiment wherein the thermoplastic plastic housing surrounds the ring;

FIG. 2 shows the embodiment of FIG. 1 mounted internally of a pulley;

FIG. 3 shows the embodiment of FIG. 1 mounted externally of a hub;

FIG. 4 shows the embodiment of FIG. 1 mounted internally of a cap;

FIG. 5 shows the embodiment of FIG. 1 mounted externally of a hub with fan blades for cooling;

FIG. 6 shows a method of making the embodiment of FIG. 1 wherein the thermoplastic plastic material ring is expanded internally against a mold;

DETAILED DESCRIPTION OF THE PREFERRED EMBODIMENTS

Figure 7:
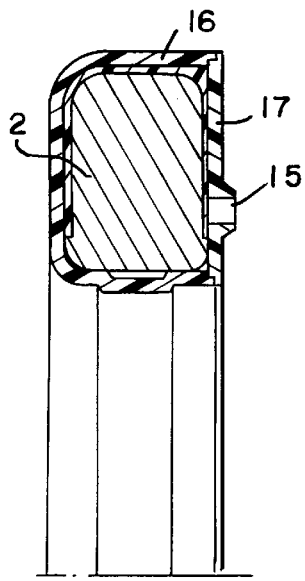
FIG. 7 shows the thermoplastic plastic material ring made in two parts.
Figure 8:
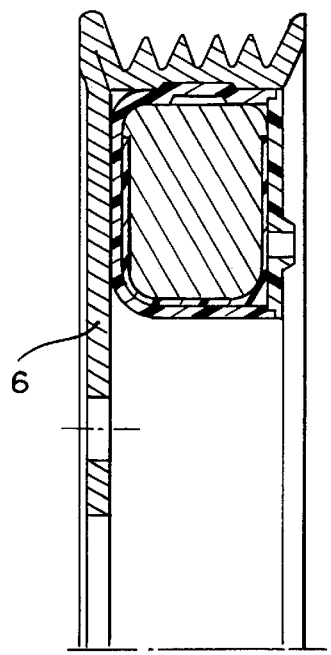
FIG. 8 show the two-part FIG. 7 embodiment mounted internally of a pulley.

First, the embodiment of FIG. 1 will be described. A viscosity-type torsional vibration damper has a housing 1 which encloses a ring-shaped working chamber. In the working chamber, a seismic ring 2 is arranged which can carry out rotating movements relative to the housing 1. A gap 3 between the housing 1 and the ring 2 is filled with a viscous damping medium. According to a basic idea of the invention, the housing 1 is made of a thermoplastic slidable material, preferably of a glass-fiber-reinforced or unreinforced polyamide (PA) or polybutylene terephthalate (PBT).

The seismic ring 2 slides without intermediate bearing elements on corresponding interior bearing surfaces 4 of the housing 1. According to the embodiments of FIGS. 1 to 6 and 12, the housing 1 encloses the seismic ring in one piece, in which case the housing 1 is mounted on a support element, preferably a pulley 6 (see FIG. 2), a hub 7 (see FIG. 3) or a cap 8 (see FIG. 4). In FIG. 5, fan blades 10 are provided for improving the heat dissipation.

FIGS. 7 to 11 show additional variants according to the invention, in the case of which the housing 1 comprises a seismic ring 2 in two or more parts (see housing chamber 16 with the lid 17). Also in this case, the arrangement on support elements, such as the pulley 6 (FIG. 8), the hub 7

(FIG. 9) or the cap 8 (FIG. 10) can even be implemented—such that the support element is constructed as an integral component of the thermoplastic housing 1 (one-piece design—FIGS. 11, 12 in FIG. 12 in the case of a one-piece housing without a lid) or the lid is unitary to the housing.

According to FIG. 5, the housing is fastened in a simple manner on the support element by a glued connection 9 and/or according to FIG. 3 by way of a clips connection 11. For a better axial fixing of the housing 1 on the support element, additional guiding elements 12 are advantageous (see FIGS. 2, 4 and 5).

Figure 12:
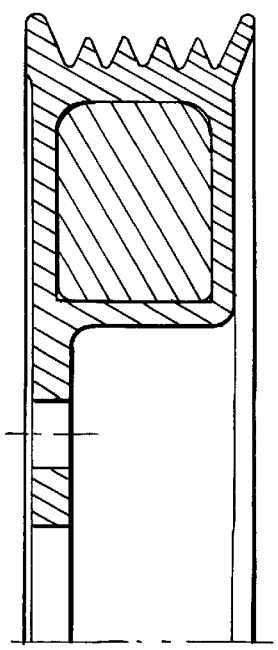
FIG. 12 shows an embodiment similar to FIG. 11 except that the housing is made as one piece with the pulley by injection molding.

When a housing is used which is constructed in one piece, a viscosity-type torsional vibration damper can be produced from only two parts (housing and ring; see, for example, FIG. 12). For reasons of stability, a support element made of a metallic material is advantageous for receiving the housing 1 and for a fastening on the crankshaft; it may even be required (depending on the power demand).

According to a manufacturing method according to the invention, the annular element 2 is surrounded by at least one jacket element 13 made of a thermoplastic material, and a viscous damping medium is entered—particularly pressed in—between the annular 2 element and the jacket element 13, in which case the gap 3 is formed. For forming the housing 1, the plastic jacket 13 is applied to a finished steel ring or cast iron ring 2, particularly by of injection molding, in which case openings 15 for injecting the damping medium are provided in the jacket during the injection molding.

The geometry of the gap 3 is formed in that the plastic-encased ring (see FIG. 6) is placed in a mold and, by way of the filling holes 15, silicone oil or air is pressed in so that the plastic jacket 13 expands until it rests against the surrounding mold 22. In this case, the ring 2 is held in the mold by way of receiving bores 14.

Before the expansion process, the plastic-encased ring 2 is heated in the mold in order to improve the flow properties of the plastic material. In addition, by way of an expansion operation in the plastic encasing, a form-locking and force-locking connection 20 is constructed to the support element (projection and notch) show in FIG. 2.

Figure 9:
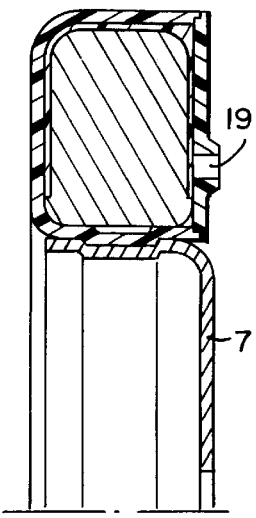
FIG. 9 shows the two-part FIG. 7 embodiment mounted externally of a hub 7.
Figure 10:
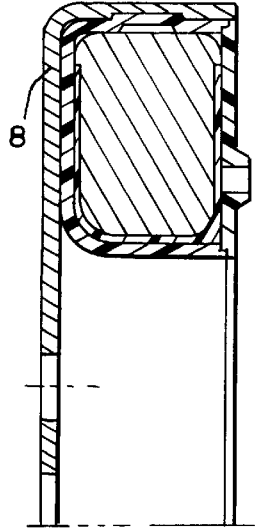
FIG. 10 shows the two-part FIG. 7 embodiment mounted internally of a cap.
Figure 11:
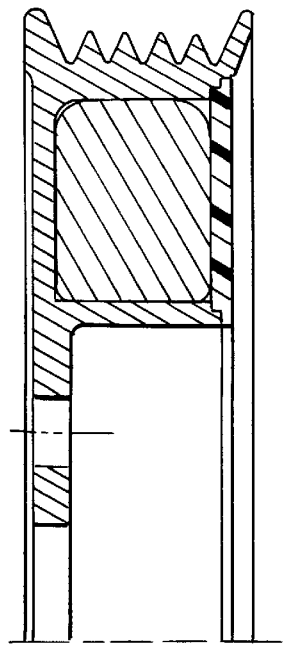
FIG. 11 shows a pulley made of a thermoplastic plastic material wherein one piece of the housing is the structure of the pulley and a separate lid is provided.

After the filling-in of the damping medium, the filling holes are closed by a valve or a ball 19 (see FIG. 9).

The housing 1 with the ring 2 is mounted on the support element either in a form-locking manner by way of a clips connection 11 or in a force-locking manner by way of a glued connection 9. In this case, the mounting connection is designed such that the radial bearing surface of the seismic ring 2 is arranged directly on the support element; for example, when the hub 7 is used, on the inside diameter of the ring 2 or, when the pulley 6 is used, on the outside diameter of the ring 2. As a result, it can be avoided that the different thermal expansions between the plastic material and the preferably metallic support element result in large tolerances in the radial bearing gap. The reinforcing by of glass fibers or other additions permits a lowering of the thermal expansion of the plastic material. On the other hand, the heat dissipation of the damper can be improved by the molding-on of the fan blades 10.

Should the glued or clips connection not be sufficient of the axial securing of the housing, additional guiding elements may be mounted or molded on the support element.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Viscosity-type torsional vibration damper comprising:
   a) a housing made of thermoplastic plastic material which encloses a ring-shaped working chamber,
   b) an annular element in the working chamber and wherein the annular element is rotatable relative to the housing,
   c) a gap between the housing and the annular element being filled with a viscous damping medium,
   d) wherein the thermoplastic plastic material provides a sliding surface for the annular element, and
   e) wherein the housing encloses the annular element in one piece and is arranged on a support element.

2. A viscosity-type torsional vibration damper according to claim 1, wherein the thermoplastic and slidable material is from the group consisting of glass-fiber-reinforced unreinforced polyamide (PA) and polybutylene terephthalate (PBT).

3. A viscosity-type torsional vibration damper according to claim 1 wherein the support element is an integral component of the thermoplastic housing.

4. A viscosity-type torsional vibration damper according to claim 1 wherein the housing is fastened to the support element by a glued connection.

* * * * *